US012614426B2

(12) United States Patent
David et al.

(10) Patent No.: US 12,614,426 B2
(45) Date of Patent: Apr. 28, 2026

(54) CONVERSION KIT FOR OPERATING DISPENSING MACHINES

(71) Applicant: Trinity Axis Inc., Schwenksville, PA (US)

(72) Inventors: Jeremiah Divyan David, Tamil Nadu (IN); David D. Davidar, Schwenksville, PA (US)

(73) Assignee: Trinity Axis Inc., Harleysville, PA (US)

( * ) Notice: Subject to any disclaimer, the term of this patent is extended or adjusted under 35 U.S.C. 154(b) by 713 days.

(21) Appl. No.: 17/989,968

(22) Filed: Nov. 18, 2022

(65) Prior Publication Data

US 2024/0169787 A1 May 23, 2024

(51) Int. Cl.
*G07F 9/02* (2006.01)
*G06Q 30/0601* (2023.01)
*G07F 5/18* (2006.01)

(52) U.S. Cl.
CPC ........... *G07F 5/18* (2013.01); *G06Q 30/0641* (2013.01)

(58) Field of Classification Search
CPC . G07F 5/18; G07F 9/001; G07F 9/002; G07F 9/023; G07F 9/026; G06Q 30/0641; G06Q 20/203
See application file for complete search history.

(56) References Cited

U.S. PATENT DOCUMENTS 7,216,754 B2 5/2007 Tedesco et al.
7,516,887 B2 4/2009 Arakaki et al.

7,627,496 B2 12/2009 Walker et al.
7,641,036 B2 1/2010 Tedesco et al.
7,643,902 B2 1/2010 Tedesco et al.
8,820,575 B2 9/2014 Nicholson
10,163,292 B1 12/2018 Romero
2004/0249711 A1 12/2004 Walker et al.

(Continued)

FOREIGN PATENT DOCUMENTS

FR 2975525 11/2012

OTHER PUBLICATIONS

International Search Report and Written Opinion for International Patent Application No. PCT/US2023/079956 dated Feb. 14, 2024. PDF file. 8 pages.

*Primary Examiner* — Justin Holmes
(74) *Attorney, Agent, or Firm* — C. Tumey Law Group PLLC

(57) ABSTRACT

Systems and methods of the present disclosure relate to retrofitting dispensing machines with an electronic device. A method comprises retrieving data from a remote server. The data includes details of items available in a dispensing machine. The data is retrieved with an electronic device. The method further includes providing a graphical representation of available products/items in the dispensing machine. The graphical representation is provided by the electronic device. The method further includes receiving at least one selection with the electronic device. The electronic device is mounted to the dispensing machine with a bracket. The electronic device comprises a user interface, a display unit, a microprocessor, at least one peripheral device, and a wireless connectivity device. The method further includes transmitting a signal from the electronic device to the dispensing machine for dispensing at least one selected item.

20 Claims, 7 Drawing Sheets

(56)  References Cited

U.S. PATENT DOCUMENTS

| | | | |
|---|---|---|---|
| 2006/0122881 | A1 | 6/2006 | Walker et al. |
| 2006/0201776 | A1 | 9/2006 | Myers et al. |
| 2006/0282323 | A1 | 12/2006 | Walker et al. |
| 2006/0293956 | A1 | 12/2006 | Walker et al. |
| 2007/0024591 | A1 | 2/2007 | Fry |
| 2007/0276537 | A1 | 11/2007 | Walker et al. |
| 2008/0040211 | A1 | 2/2008 | Walker et al. |
| 2008/0249658 | A1 | 10/2008 | Walker et al. |
| 2010/0114368 | A1 | 5/2010 | Walker et al. |
| 2010/0268792 | A1 | 10/2010 | Butler et al. |
| 2021/0065492 | A1 | 3/2021 | Rosburg et al. |
| 2021/0327201 | A1* | 10/2021 | Patel ........................ G07F 9/006 |
| 2022/0180689 | A1* | 6/2022 | Kwon ..................... G07F 11/02 |

* cited by examiner

CONVERSION KIT FOR OPERATING DISPENSING MACHINES

BACKGROUND

Dispensing machines dispense a variety of items, including beverages, food, and other consumer products. However, the technology used in some of these machines may be outdated resulting in inconvenience and/or more time spent in front of the machine.

SUMMARY

Disclosed herein are exemplary systems and methods for operating an electronic device retrofitted to a dispensing machine. A method comprises retrieving data from a remote server. The data includes details of items/products available in a dispensing machine. The data is retrieved with an electronic device. The method further includes providing a graphical representation of available products in the dispensing machine. The graphical representation is provided by the electronic device. The method further includes receiving at least one selection with the electronic device. The electronic device is mounted to the dispensing machine with a bracket. The electronic device comprises a user interface, a display unit, a microprocessor, at least one peripheral device, and a wireless connectivity device. The method further includes transmitting a signal from the electronic device to the dispensing machine for dispensing at least one selected item.

A system includes an electronic device comprising a user interface, a display unit, a microprocessor, at least one peripheral device, and a wireless connectivity device. The system also includes a bracket and a dispensing machine. The electronic device is in communication with the dispensing machine and mounted to the dispensing machine via the bracket.

BRIEF DESCRIPTION OF THE DRAWINGS

These drawings illustrate certain aspects of some examples of the present disclosure and should not be used to limit or define the disclosure.

DETAILED DESCRIPTION

It is to be understood that the present disclosure is not limited to particular devices or methods, which may, of course, vary. It is also to be understood that the terminology used herein is for the purpose of describing particular embodiments only and is not intended to be limiting. All numbers and ranges disclosed herein may vary by some amount. Whenever a numerical range with a lower limit and an upper limit is disclosed, any number and any included range falling within the range are specifically disclosed. Although individual embodiments are discussed herein, the invention covers all combinations of all those embodiments. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected. If there is any conflict in the usages of a word or term in this specification and one or more patent or other documents that may be incorporated herein by reference, the definitions that are consistent with this specification should be adopted for the purposes of understanding this invention.

The present disclosure relates to systems and methods that include conversion kits for retrofit mounting onto a dispensing system/machine. The conversion kits allow for viewing, selecting, and purchasing of at least one item via an electronic device that may be retrofitted/attached and in communication with the dispensing machine. The dispensing machine dispenses a broad range of products/items for consumers. In some examples, the electronic device may be attached to a side (e.g., front, customer facing) of the dispensing system and may be in communication with the electronics (via a plug/wires) of the dispensing system to allow for viewing, selecting, and purchasing of at least one item from the dispensing machine via the interface of the electronic device.

Figure 1:
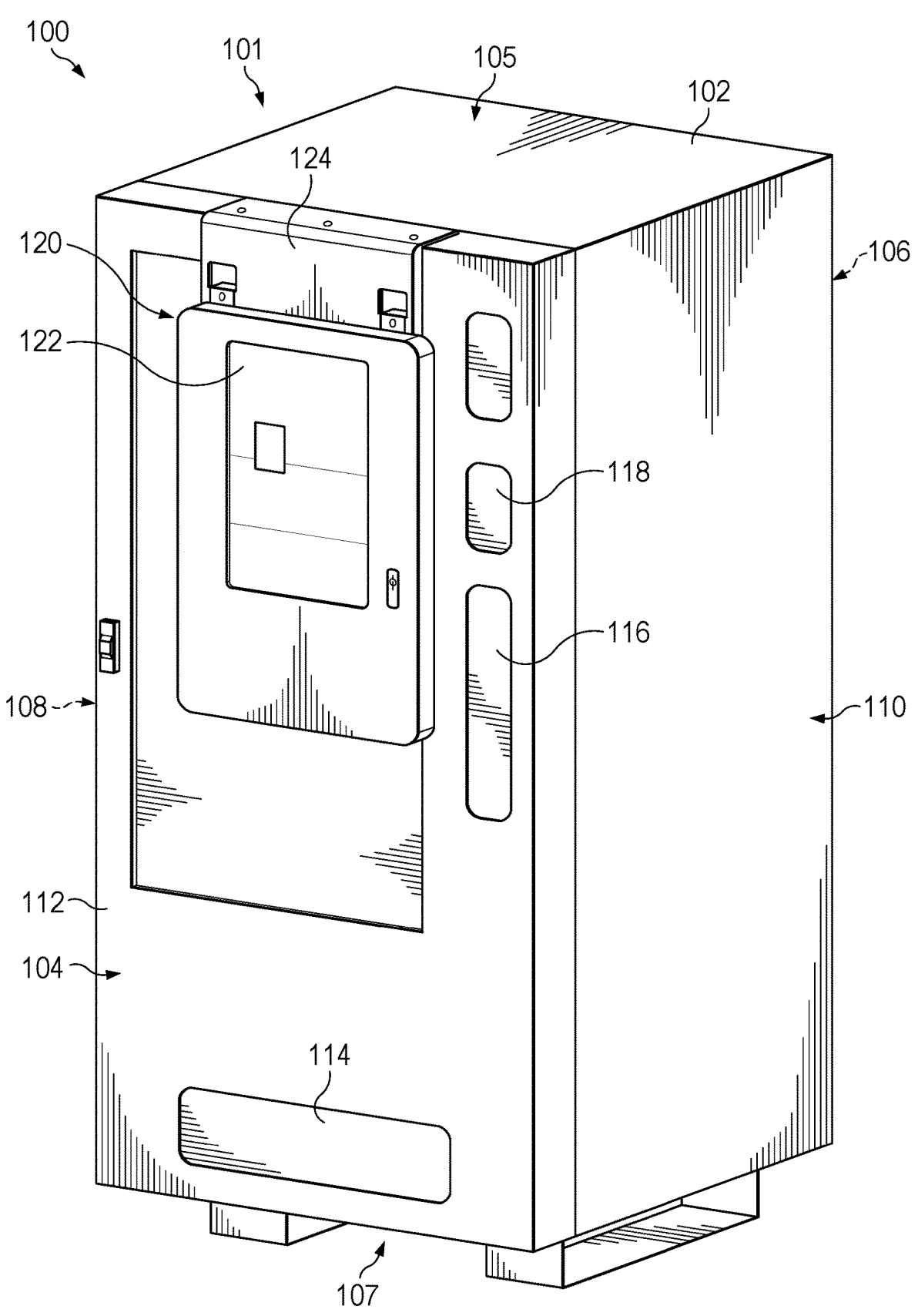
FIG. 1 illustrates a dispensing system and an electronic device mounted thereto, in accordance with examples of the present disclosure.

FIG. 1 illustrates a dispensing system 100 and an electronic device mounted thereto, in accordance with examples of the present disclosure. The dispensing system 100 is a non-limiting example of a dispensing system and may include a dispensing machine 101 (e.g., a vending machine). The dispensing system 100 includes a housing 102 that houses internal components (not shown) of the dispensing system 100. As illustrated, the dispensing system 100 may include a front side 104, a top side 105, a rear side 106, a bottom side 107, a left lateral side 108, and a right lateral side 110. The front side 104 may include a door 112 (e.g., a hinged door or sliding door) which may be opened to allow access to an interior of the dispensing system 100 for servicing or stocking of consumer products, for example. The door 112 may include a gate 114 for access to purchased products that have fallen in a retrieval bin (product collection area) that is positioned behind the gate 114. In some examples, the gate 114 may be optional to allow open access to purchased products in the retrieval bin.

In some examples, the dispensing machine 101 may also include an input unit 116 coupled to a microcontroller 118 to operate the dispensing machine 101. In some examples, the dispensing machine 101 may include a display, a storage unit, and/or any instrumentality or aggregate of instrumentalities operable to compute, estimate, classify, process, transmit, receive, retrieve, originate, switch, store, display, manifest, detect, record, reproduce, handle, validate, or utilize any form of information, intelligence, or data for business, scientific, control, or other purposes.

The dispensing machine 101 may include a processing unit (e.g., microprocessor, central processing unit, programmable logic controller (PLC), etc.) that may process data by executing software or instructions obtained from a local non-transitory computer readable media (e.g., optical disks, magnetic disks). The non-transitory computer readable media may store software or instructions of the methods described herein. Non-transitory computer readable media may include any instrumentality or aggregation of instrumentalities that may retain data and/or instructions for a period of time. The non-transitory computer readable media may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

The dispensing machine 101 may also include input device(s) (e.g., sensor(s), keyboard, mouse, touchpad, scanners, RFID readers, card readers, NFC readers, data reader devices) and output device(s) (e.g., monitor, printer, secondary display unit). The sensors may include a motion sensor (e.g., PIR), a heat sensor, and/or an input sensor. The input device(s) and output device(s) provide a user interface.

A conversion kit 120 includes an electronic device 122 and a bracket 124 for attaching the electronic device 122 to the dispensing machine 101. In some examples, the electronic device 122 may be attached to a side (e.g., front, customer facing). The electronic device 122 may be attached to a side that would face a customer during operation of the dispensing machine 101, such as the front side 104, for example. The bracket 124 may be installed on the door 112 to still allow opening of the door 112. The electronic device 122 may occupy a portion of the front side 104 and may hang from the bracket 124, in some examples.

In some examples, the electronic device 122 may include a display, a storage unit, and/or any instrumentality or aggregate of instrumentalities operable to compute, estimate, classify, process, transmit, receive, retrieve, originate, switch, store, display, manifest, detect, record, reproduce, handle, validate, or utilize any form of information, intelligence, or data for business, scientific, control, or other purposes.

The electronic device 122 may include at least one processing unit (e.g., microprocessor, central processing unit (e.g., at least one microprocessor and/or at least one microcontroller), programmable logic controller (PLC), etc.) that may process data by executing software or instructions obtained from a local non-transitory computer readable media (e.g., optical disks, magnetic disks). The non-transitory computer readable media may store software or instructions of the methods described herein. Non-transitory computer readable media may include any instrumentality or aggregation of instrumentalities that may retain data and/or instructions for a period of time. The non-transitory computer readable media may include, for example, storage media such as a direct access storage device (e.g., a hard disk drive or floppy disk drive), a sequential access storage device, compact disk, electrically erasable programmable read-only memory (EEPROM), and/or flash memory; as well as communications media such wires, optical fibers, microwaves, radio waves, and other electromagnetic and/or optical carriers; and/or any combination of the foregoing.

The electronic device 122 may also include input device(s) (e.g., sensor(s), keyboard, mouse, touchpad, scanners, RFID readers, card readers, NFC readers, data reader devices) and output device(s) (e.g., monitor, printer, secondary display unit). The sensors may include a motion sensor (e.g., PIR), a heat sensor, and/or an input sensor. The input device(s) and output device(s) provide a user interface.

Figure 2A:
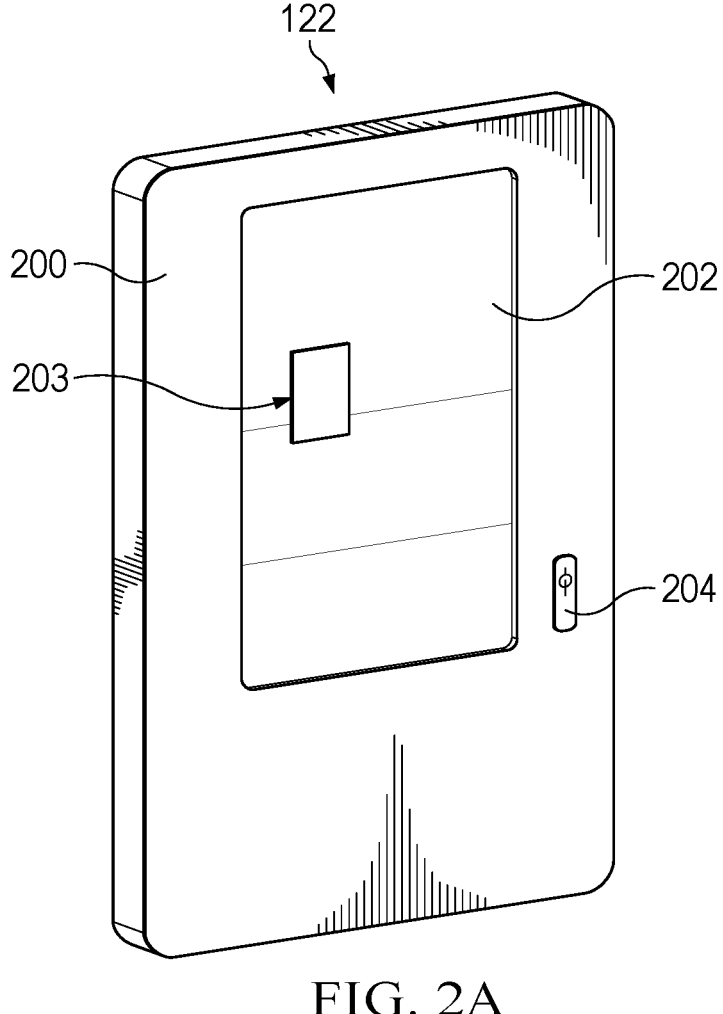
FIG. 2A illustrates a front side of an electronic device for retrofitting onto a dispensing machine, in accordance with examples of the present disclosure.

FIG. 2A illustrates a front side of the electronic device 122, in accordance with examples of the present disclosure. The electronic device 122 may include a housing 200 and may contain electronics. In some non-limiting examples, a height of the housing 200 may range from about 6 inches to 2 feet, and the width may be similar. It should be noted that the housing 200 may include various shapes and sizes (e.g., parallelogram, circle, oval, triangle). In non-limiting examples, a thickness may range from 1 inch to 6 inches.

Figure 2B:
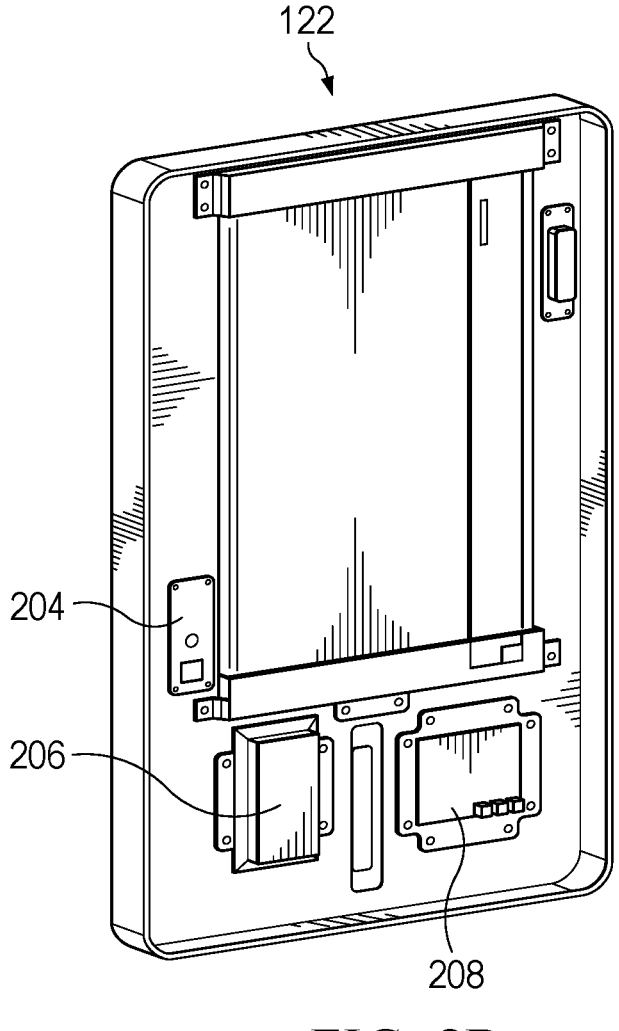
FIG. 2B illustrates a back of the electronic device, in accordance with examples of the present disclosure.

A display 202 may be disposed on the front of the electronic device 122. The display 202 may provide a graphical representation 203 of available products in the dispensing machine. The electronic device 122 may also include peripheral devices 204 that may include at least one of RFID, NFC, cashless readers, or card readers. FIG. 2B illustrates a rear of the electronic device 122. The peripheral devices 204 may extend through the back from the front side. The electronic device 122 may also include at least one microprocessor 206 and at least one microcontroller 208.

Figure 3:
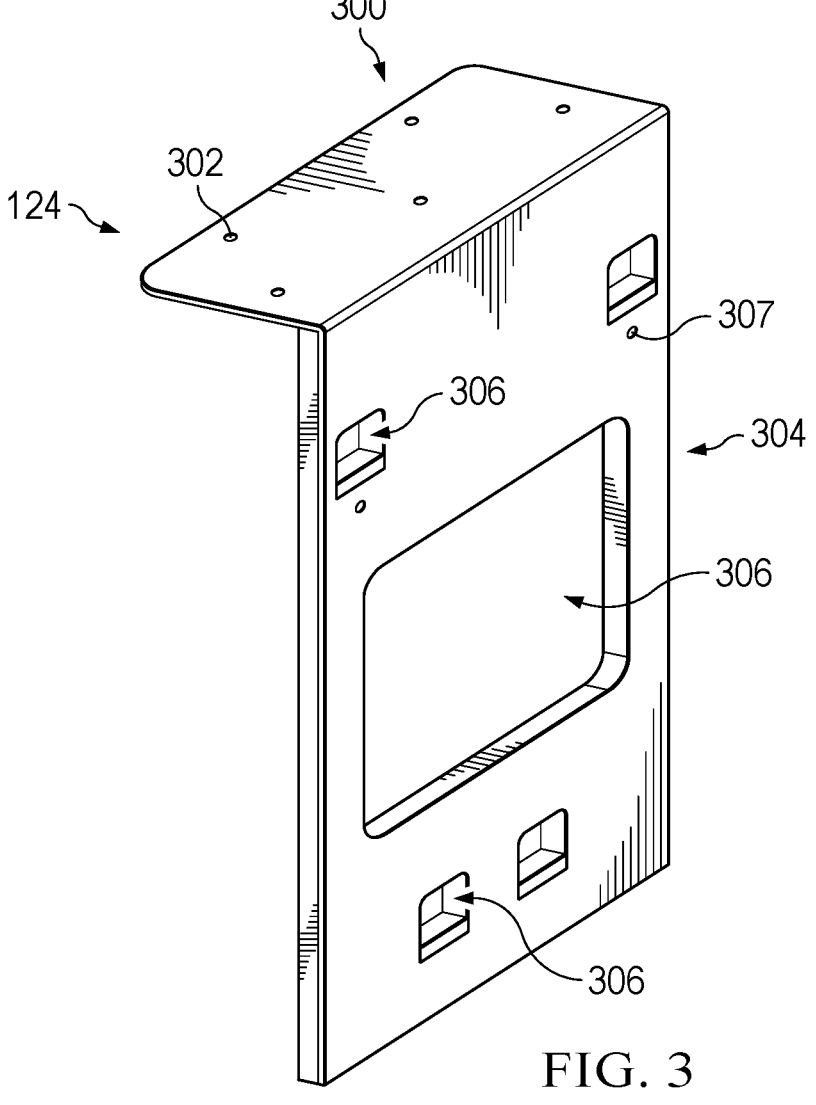
FIG. 3 illustrates a close-up view of a bracket for mounting the electronic device, in accordance with examples of the present disclosure.

FIG. 3 illustrates a close-up view of the bracket 124, in accordance with examples of the present disclosure. The bracket 124 may be made of metal and/or plastic and may include a lateral section 300 (e.g., overhang) configured to mount to a top of a portion of a dispensing machine. Holes 302 may be included in the lateral section 300 to receive fasteners (e.g., screws) to secure the bracket 124 to the dispensing machine. The lateral section 300 may extend from a vertical portion 304 that may extend along a customer facing side of the dispensing machine. The vertical portion 304 may include passages 306 to connect components of the electronic device to the dispensing machine for communication (e.g., lines/wires). Additionally, the passages 306 may be used to mount the electronic device to the bracket 124. The dimensions of the bracket 124 may be smaller than those of the electronic device. For example, a height and width may range from 4 inches to 1 ft; a thickness may range from ⅛ inch to ¾ inch. Holes 307 may also be included in the vertical portion 304 to receive fasteners (e.g., screws) to secure the bracket 124 to the dispensing machine. The holes 302 and the holes 307 be used for fitment and ensure rigidity of the bracket 124. That is, the combination of the holes 302 and the vertical portion 304 secure the electronic device to the dispensing system/machine. The holes 307 and the passages 306 secure the electronic device to the bracket 124 in directions along x, y, and z axes.

Figure 4A:
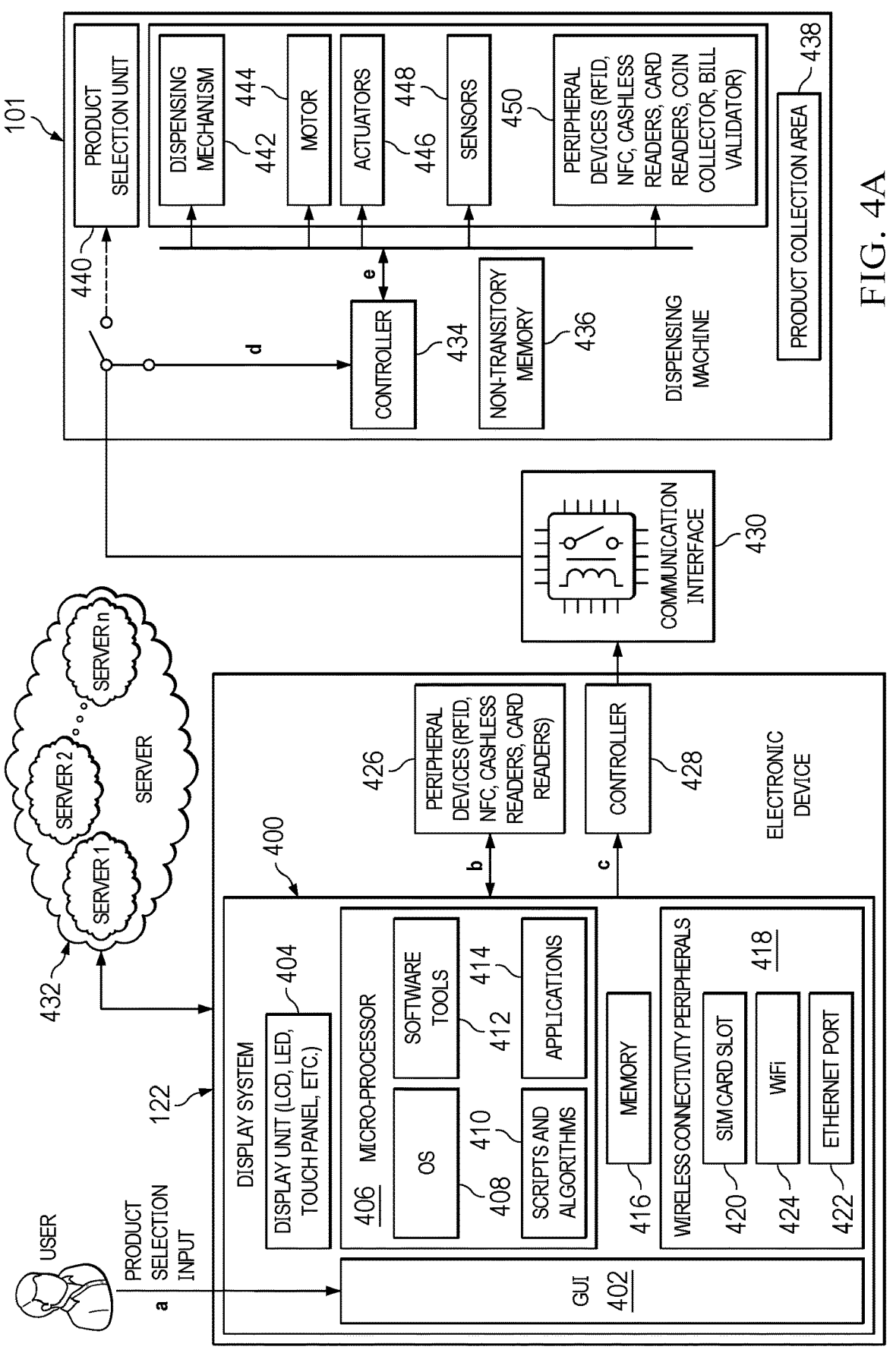
FIG. 4A illustrates a schematic diagram of the electronic device connected to the dispensing machine with a communication interface, in accordance with examples of the present disclosure.
Figure 4B:
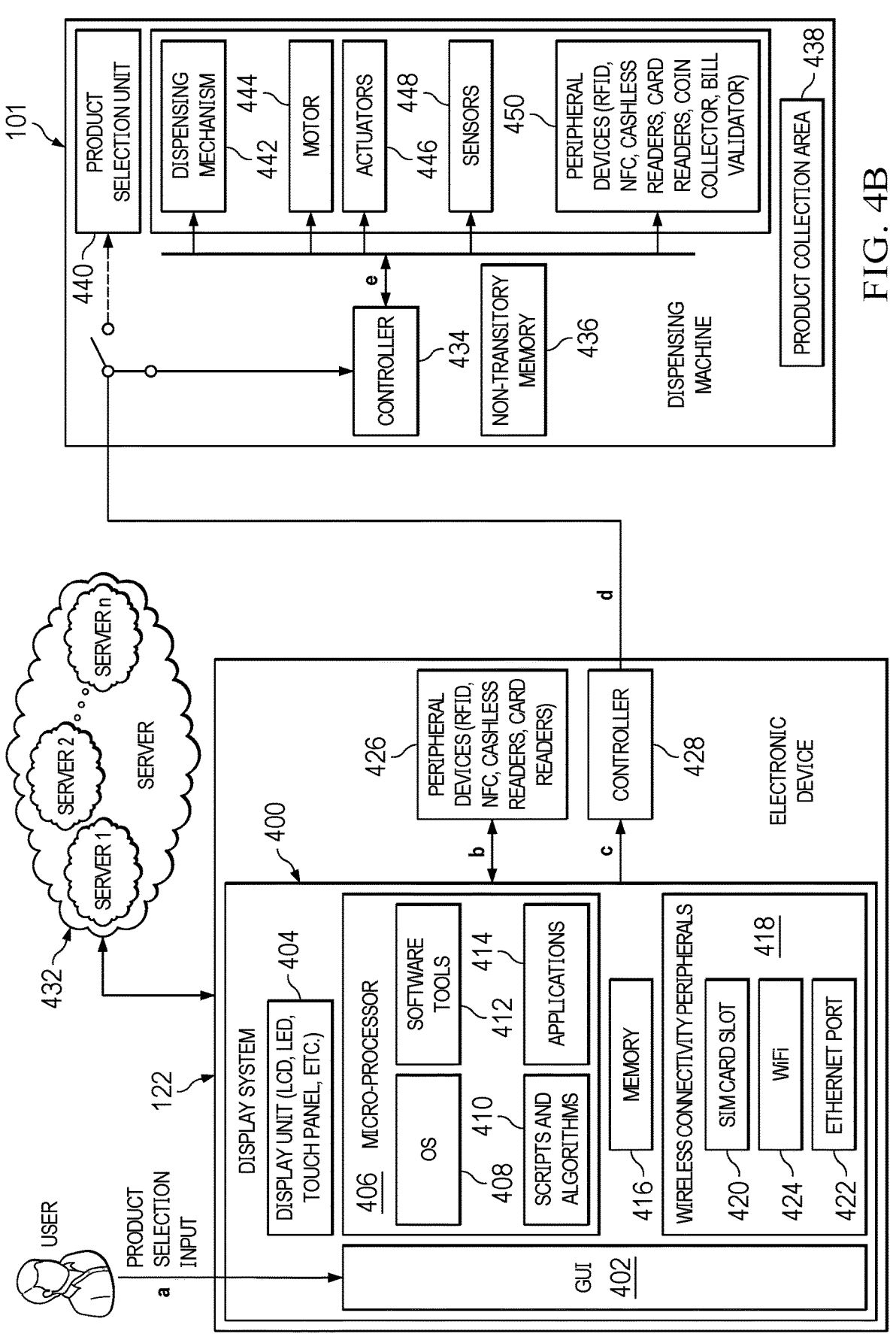
FIG. 4B illustrates a schematic diagram of the electronic device connected to the dispensing machine directly without the communication interface, in accordance with examples of the present disclosure.

FIGS. 4A and 4B illustrate schematic diagrams of the electronic device 122 connected to the dispensing machine 101, in accordance with examples of the present disclosure. The electronic device 122 may include a display system 400 that includes a GUI 402, a display unit 404 (e.g., LCD, LED, touch panel), a microprocessor 406, operating system 408 (OS), scripts and algorithms 410, software tools 412, applications 414, memory 416, and wireless connectivity and peripheral devices 418 (e.g., SIM card slot 420, wireless module 422, ethernet port 424), and sensor(s) (e.g., motion sensor(s), light sensor(s)).

The display system 400 may be connected to peripheral devices 426 (e.g., a payment system) that may include at least one of RFID, NFC, cashless readers, or card readers. The display system 400 may also be connected to a system controller 428. The system controller 428 (e.g., PLC) may be connected (e.g., plugged in) to a communication interface 430 (e.g., circuit board, wires) that allows communication between the electronic device 122 and the dispensing machine 101. The electronic device 122 may also be in communication with at least one server 432 for inventory updates and/or sales data, for example.

The dispensing machine 101 may include a system controller 434 (e.g., PLC), non-transitory memory 436, and a product collection area 438. The system controller 434 may be in communication with other components of the dispensing machine 101 such as, for example, a product selection unit 440, a dispensing mechanism 442, and related components such as a motor 444, actuators 446, sensors 448, and peripheral devices 450 (e.g., at least one of RFID, NFC, cashless readers, or card readers). In some examples, a wire connecting the system controller 434 to the product selection unit 440 may be removed, and the system controller 434 may be directly wired to the system controller 428 with the removed wire.

In some examples (see FIG. 4A), an operative sequence may include the following steps: step (a) a user inputs a selection(s) (the electronic device 122 receives an input) based on data (e.g., information about items available in the dispensing machine) received with the electronic device 122 from a server(s) 432; step (b) the display system 400 and the peripheral devices 426 communicate/validate payment information/data with each other; step (c) the display system 400 communicates selection(s)/input(s) to the system controller 428 which sends a signal(s) to the dispensing machine 101 via the communication interface 430; step (d) the signal(s) from the communication interface 430 is transmitted to the system controller 434; step (e) data/instructions/signal(s) from the system controller 434 are transmitted to the dispensing mechanism 442 and the related components to dispense the selected item(s) to the product collection area 438.

In some examples, before step (a), the display system 400 fetches data from the remote server(s) 432. The data include the details of the product/item(s) such as images, descriptions of the product/item, product/item name, product/item identification(s) (IDs), quantity available in the dispensing machine, and then a user may use the display system 400 to make a selection. Then at step (a), when a selection is made on the GUI 402 and upon validation by at least any one of the peripheral devices 426 (step (b)), a signal is sent from the display system 400 via the system controller 428 (for the electronic device 122) (step (c)) and the communication interface 430 to the system controller 434 (for the dispensing machine 101) (step (d)). The system controller 434 actuates the dispensing mechanism 442 to dispense a product from the dispensing machine 101 (step (e)). In other examples (see FIG. 4B), the system controller 428 is directly coupled to the system controller 434.

Figure 5:
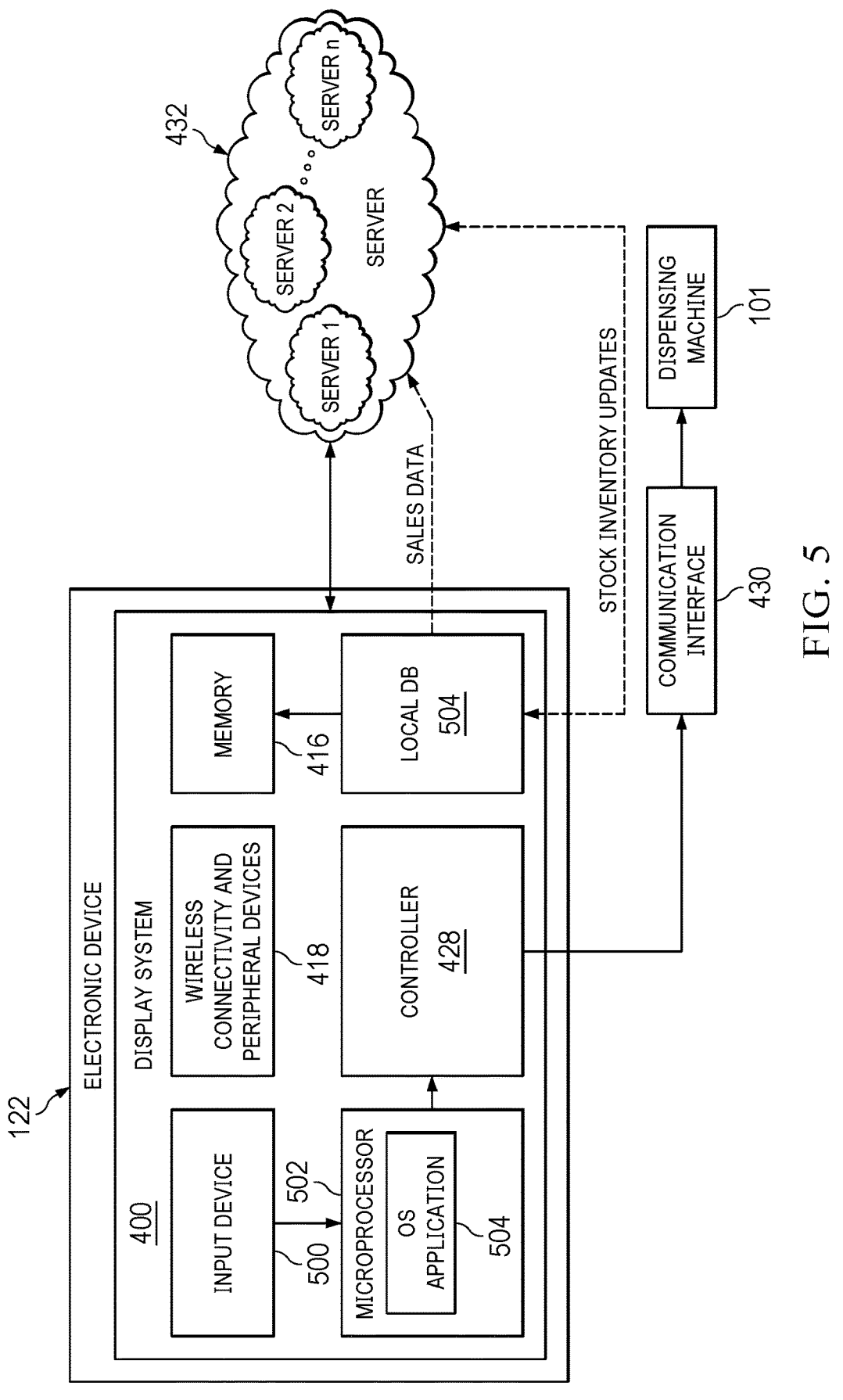
FIG. 5 illustrates a schematic diagram of the electronic device in communication with the dispensing machine and one or more servers, in accordance with examples of the present disclosure.

FIG. 5 illustrates a schematic diagram of the electronic device 122 in communication with the dispensing machine 101 and the server(s) 432, in accordance with examples of the present disclosure. The electronic device 122 may include the display system 400 that includes an input device 500 (e.g., touchscreen, buttons), a microprocessor 502, OS application 504, the system controller 428 (e.g., PLC), the memory 416, wireless connectivity and peripheral devices 418, and a local database (DB) 504. The DB 504 and the server 432(s) may communicate sales data and/or inventory updates with each other. As noted above, the display system

400 fetches data from the remote server(s) 432 for display on the electronic device 122 for a user to make a selection. The data include the details of the products/items in the dispensing machine such as images, descriptions of the products, product names, product IDs, quantity available in the dispensing machine. When at least one selection is made on the display system 400, a signal(s) is sent from the display system 400 via a system controller 428 and the communication interface 430 to the dispensing machine 101. The product is then dispensed from the dispensing machine 101.

The communication interface 430 allows transmission of data between the dispensing machine 101 (e.g., vending machine) and the electronic device 122. The sales data is sent from the display system 400 via wireless connection to one of the remote servers 432 and the inventory data of available products in the dispensing machine 101 is updated on the display system 400. When a stock of items/products is loaded in the dispensing machine 101, another software application may be used to update the data on at least one of the remote servers.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

What is claimed is:

1. A method comprising:
retrieving data from a remote server, the data including details of items available in a dispensing machine, the data retrieved with an electronic device, the dispensing machine comprising a dispensing mechanism, one or more actuators, and a product collection area;
providing a graphical representation of the items in the dispensing machine, the graphical representation provided by the electronic device, the electronic device comprising: at least a user interface, a display unit, a microprocessor, at least one peripheral device, and/or a wireless connectivity device;
receiving at least one selection with the electronic device, the electronic device comprising a bracket for attaching the electronic device to the dispensing machine, the bracket having a vertical portion and a lateral portion; and
transmitting a signal from the electronic device to the dispensing machine to cause the dispensing machine to dispense, via the dispensing mechanism and the one or more actuators, at least one selected item into the product collection area.

2. The method of claim 1, wherein the details include one or more of an image, description of an item, item name, item identification, quantity available in the dispensing machine.

3. The method of claim 1, wherein the electronic device further comprises a system controller.

4. The method of claim 3, wherein the dispensing machine includes a system controller, wherein the system controller of the dispensing machine is directly coupled to the system controller of the electronic device.

5. The method of claim 2, further comprising updating inventory data and sales data via the remote server.

6. The method of claim 1, further dispensing at least one selected item into the product collection area.

7. The method of claim 1, wherein the lateral portion is an overhang configured to mount the electronic device to a top portion of the dispensing machine, and wherein the top portion of the dispensing machine comprises a top portion of a door of the dispensing machine.

8. The method of claim 1, wherein the electronic device is disposed on the vertical portion of the bracket.

9. The method of claim 7, wherein the lateral portion of the bracket comprises one or more holes configured to receive one or more fasteners to secure the bracket to the top portion of the dispensing machine.

10. The method of claim 1, wherein the dispensing machine includes one or more peripheral devices.

11. A system comprising:

an electronic device comprising: a user interface, a display unit, a microprocessor, at least one peripheral device, and a wireless connectivity device;

a dispensing machine comprising a dispensing mechanism, one or more actuators, and a product collection area, wherein the electronic device in communication with the dispensing machine, and a bracket for attaching the electronic device to the dispensing machine and having a vertical portion and a lateral portion, wherein the lateral portion is mounted to a top portion of the dispensing machine.

12. The system of claim 11, wherein the lateral portion is an overhang configured to mount the electronic device to the top portion of the dispensing machine, and wherein the top portion of the dispensing machine comprises a top portion of a door of the dispensing machine.

13. The system of claim 12, wherein the electronic device is disposed on the vertical portion of the bracket, such that the electronic device hangs from the bracket to cover, at least partially, a front side of the door of the dispensing machine.

14. The system of claim 11, wherein the lateral portion of the bracket comprises one or more holes configures to receive one or more fasteners to secure the bracket to the top portion of the dispensing machine.

15. The system of claim 11, wherein the bracket includes passages for connectivity between the electronic device and the dispensing machine.

16. The system of claim 11, wherein the dispensing machine includes a vending machine.

17. The system of claim 11, further comprising a remote server.

18. The system of claim 11, wherein the dispensing machine includes one or more peripheral devices.

19. The system of claim 11, wherein the dispensing machine includes non-transitory memory.

20. The system of claim 11, wherein the electronic device and the bracket are provided together in a conversion kit for retrofit mounting the electronic device onto a door of the dispensing machine, wherein the electronic device is disposed on the vertical portion of the bracket so as to cover, at least partially, a front side of the door.

\* \* \* \* \*